US009609570B2

(12) United States Patent
Sachs et al.

(10) Patent No.: US 9,609,570 B2
(45) Date of Patent: Mar. 28, 2017

(54) METHOD AND NETWORK NODE FOR HANDLING HANDOVER

(71) Applicant: Telefonaktiebolaget L M Ericsson (publ), Stockholm (SE)

(72) Inventors: Joachim Sachs, Sollentuna (SE); Fredrik Gunnarsson, Linköping (SE); Reihaneh Malekafzaliardakani, Sollentuna (SE); Yngve Selèn, Uppsala (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 42 days.

(21) Appl. No.: 14/646,215

(22) PCT Filed: Nov. 28, 2012

(86) PCT No.: PCT/SE2012/051308
§ 371 (c)(1),
(2) Date: May 20, 2015

(87) PCT Pub. No.: WO2014/084762
PCT Pub. Date: Jun. 5, 2014

(65) Prior Publication Data
US 2015/0304933 A1    Oct. 22, 2015

(51) Int. Cl.
*H04W 36/32* (2009.01)
*H04W 36/14* (2009.01)
(Continued)

(52) U.S. Cl.
CPC ............. *H04W 36/32* (2013.01); *H04W 4/02* (2013.01); *H04W 36/14* (2013.01); *H04W 36/22* (2013.01);
(Continued)

(58) Field of Classification Search
CPC ... H04W 36/32; H04W 72/0453; H04W 4/02; H04W 36/14; H04W 36/22; H04W 88/02; H04W 8/186
See application file for complete search history.

(56) References Cited

U.S. PATENT DOCUMENTS

2006/0166699 A1    7/2006  Aghvami et al.
2006/0268755 A1*  11/2006  Pajukoski ............. H04L 1/0003
                                                            370/282
(Continued)

FOREIGN PATENT DOCUMENTS

GB    WO 2007089128 A1 *  8/2007  ........ H04W 36/0088
WO    WO 2013052917 A2 *  4/2013  ............. H04L 5/001

OTHER PUBLICATIONS

PCT Written Opinion of the International Searching Authority for International application No. PCT/SE2012/051308, Jul. 22, 2013.
(Continued)

*Primary Examiner* — Kashif Siddiqui
*Assistant Examiner* — Minjung Kim
(74) *Attorney, Agent, or Firm* — Baker Botts, LLP

(57) ABSTRACT

A method in a network node for allocating to user equipments a respective carrier is provided. The carrier is a frequency carrier for wireless communication. The network node is comprised in a cellular network. The network node identifies (202) a set of carriers. The carriers in the set of carriers each are associated with a respective geographic handover region for handover between cells. The geographic handover regions of the carriers differ from each other more than a threshold. When the network node has identified (203) a group of user group of user equipments with correlated mobility pattern, it allocates (204) to at least two of the user equipments within the group of user equipments a respective carrier. The allocation is performed such that the
(Continued)

Differing geographic hand over regions at least two user equipments in the group are spread among the carriers in the set of carriers.

24 Claims, 4 Drawing Sheets

(51) Int. Cl.
  *H04W 36/22* (2009.01)
  *H04W 4/02* (2009.01)
  *H04W 72/04* (2009.01)
  *H04W 8/18* (2009.01)
  *H04W 88/02* (2009.01)
(52) U.S. Cl.
  CPC ........ *H04W 72/0453* (2013.01); *H04W 8/186* (2013.01); *H04W 88/02* (2013.01)

(56) References Cited

U.S. PATENT DOCUMENTS

| | | | |
|---|---|---|---|
| 2008/0045262 A1* | 2/2008 | Phan | ................ H04W 36/0083 455/525 |
| 2011/0053593 A1 | 3/2011 | Tanabe et al. | |
| 2011/0111753 A1 | 5/2011 | Vainikka et al. | |
| 2014/0057635 A1* | 2/2014 | Sergeyev | .............. H04W 48/20 455/440 |

OTHER PUBLICATIONS

International Search Report for International application No. PCT/SE2012/051308, Jul. 22, 2013.

\* cited by examiner

METHOD AND NETWORK NODE FOR HANDLING HANDOVER

PRIORITY

This nonprovisional application is a U.S. National Stage Filing under 35 U.S.C. §371 of International Patent Application Serial No. PCT/SE2012/051308, filed Nov. 28, 2012, and entitled "METHOD AND NETWORK NODE FOR HANDLING HANDOVER."

TECHNICAL FIELD

Embodiments herein relate to a network node and methods therein. In particular, it relates to allocating to user equipments a respective carrier.

BACKGROUND

Communication devices such as User Equipments (UEs) are also known as e.g. terminals, mobile terminals, wireless terminals and/or mobile stations. User equipments are enabled to communicate wirelessly in a cellular communications network or wireless communication system, sometimes also referred to as a cellular radio system or cellular networks. The communication may be performed e.g. between two user equipments, between a user equipment and a regular telephone and/or between a user equipment and a server via a Radio Access Network (RAN) and possibly one or more core networks, comprised within the cellular communications network.

User equipments may further be referred to as mobile telephones, cellular telephones, laptops, or surf plates with wireless capability, just to mention some further examples. The user equipments in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. When a user equipments moves, it measures on signals transmitted by one or more base stations for specific cells. The user equipment can thereby determine the signal strength for a particular radio cell. The measurement results are typically reported to the base station. When the quality of a signal of another radio cell than the one that the user equipment is currently connected to, exceeds by more than a threshold, compared to the signal quality of the cell that the user equipment is currently connected to, a handover to the stronger cell is typically performed for the user equipment. A handover procedure typically comprises measurements performed by the user equipment, measurement reports transmitted by the user equipment to a network node, e.g. a base station, a handover logic determining the target cell for the user equipment, handover preparation signalling towards the network node controlling the target cell, handover signalling towards the user equipment to instruct it to execute handover, possibly comprising also parameters that have been obtained in the handover preparation procedure. Different variants of handover are known in the art. One base station, situated on the base station site, may serve one or several cells. Further, each base station may support one or several communication technologies. The base stations communicate over the air interface operating on radio frequencies with the user equipments within range of the base stations. In the context of this disclosure, the expression Downlink (DL) is used for the transmission path from the base station to the user equipment. The expression Uplink (UL) is used for the transmission path in the opposite direction i.e. from the user equipment to the base station.

In 3rd Generation Partnership Project (3GPP) Long Term Evolution (LTE), base stations, which may be referred to as eNodeBs or even eNBs, may be directly connected to one or more core networks.

Universal Mobile Telecommunications System (UMTS) is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

3GPP LTE radio access standard has been written in order to support high bitrates and low latency both for uplink and downlink traffic. All data transmission is in LTE controlled by the radio base station.

Sometimes, many user equipments are traveling together as a group. This may be the case when many user equipments are traveling in the same moving object, such as a train, car, boat, etc. When many user equipments move as a group from cell to cell, they simultaneously perform handovers between the cells on their way. Since a handover from one cell to another requires a lot of signalling, this leads to high signaling peaks at cell borders that may lead to dropped calls and connections, reduced data rates, etc.

A solution to the above problem is the introduction of mobile relay nodes comprising mobile cells, to be sited in the moving object, as being addressed in 3GPP TR 36.836. However, a mobile relay has many challenges by itself from the complexity of managing moving relay cells within the 3GPP architecture.

SUMMARY

Therefore an object of embodiments herein is to provide an improved way of handling many user equipments moving as a group in a cellular network.

According to a first aspect of embodiments herein, the object is achieved by a method in a network node for allocating to user equipments a respective carrier. The carrier is a frequency carrier for wireless communication. The network node is comprised in a cellular network. The network node identifies a set of carriers. The carriers in the set of carriers each are associated with a respective geographic handover region for handover between cells. The geographic handover regions of the carriers differ from each other more than a threshold. When the network node has identified a group of user equipments with correlated mobility pattern, it allocates to at least two of the user equipments within the group of user equipments a respective carrier. The allocation is performed such that the at least two user equipments in the group are spread among the carriers in the set of carriers.

According to a second aspect of embodiments herein, the object is achieved by a method in a network node for allocating to user equipments a respective carrier. The carrier is a frequency carrier for wireless communication. The network node is arranged to be comprised in a cellular network. The network node comprises an identifying circuit configured to identify a set of carriers. The carriers in the set of carriers each are associated with a respective geographic handover region for handover between cells. The geographic handover regions of the carriers differ from each other more than a threshold. The identifying circuit further is configured to identify a group of user equipments with correlated mobility pattern. The network node further comprises an allocating circuit configured to allocate to at least two of the user equipments within the group of user equipments respective different carrier in the set of carriers, such that the at least two user equipments in the group are spread among the carriers in the set of carriers.

The network node allocates to at least two of the user equipments within the group of user equipments respective different carrier in the set of carriers, such that the at least two user equipments in the group are spread among the carriers in the set of carriers. Further, since the carriers comprise a respective geographic handover region that differs from each other more than a threshold, the handover of the at least two user equipments in the identified a group of user equipments with correlated mobility pattern are performed at different points in time. This results in that a signalling peak due to handover of many user equipments at the same time is prevented. The effect of this is that the handling of many user equipments moving as a group in a cellular network is improved.

BRIEF DESCRIPTION OF THE DRAWINGS

Examples of embodiments herein are described in more detail with reference to attached drawings in which.

DETAILED DESCRIPTION

Figure 1:
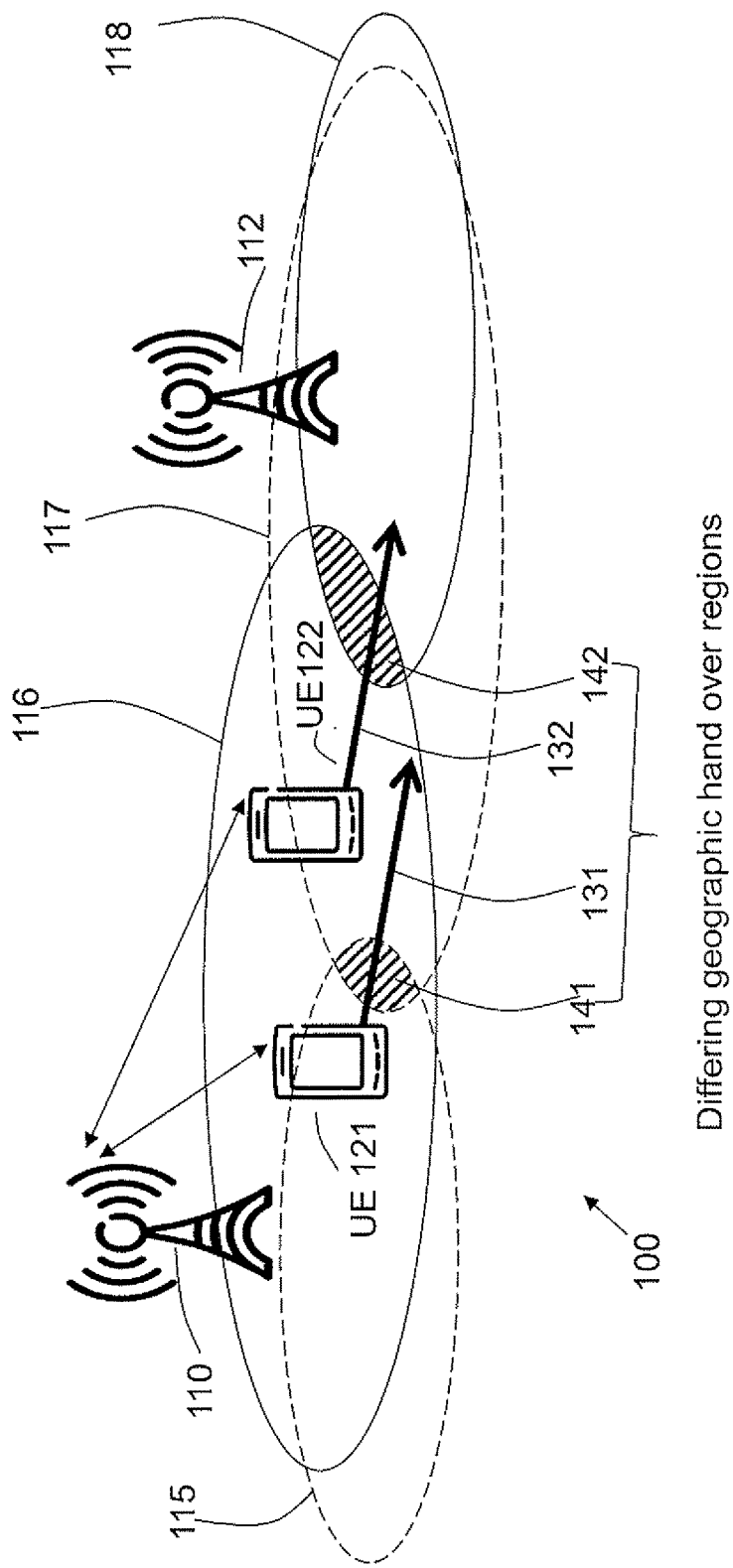
FIG. 1 is a schematic block diagram illustrating embodiments of a cellular network.

FIG. 1 depicts a cellular network 100 in which embodiments herein may be implemented. The cellular network 100 is a wireless communication network such as an LTE (e.g. LTE FDD, LTE TDD, LTE HD-FDD), WCDMA, UTRA TDD, GSM network, GERAN network, enhanced data rate for GSM evolution (EDGE) network, network comprising of any combination of RATs such as e.g. Multi-Standard Radio (MSR) base stations, multi-RAT base stations etc., any 3GPP cellular network, Wimax, or any cellular network or system.

The cellular network 100 comprises a plurality of network nodes operated by one or more operators, whereof two, a network node 110 and a second network node 112 is depicted in FIG. 1. The network node 110 and second network node 112 may be radio base stations such as e.g. eNBs, eNodeBs, or Home NodeBs, Home eNodeBs or any other network node capable to serve a user equipment or a machine type communication device in a cellular network. The network node may also be a radio network controller that controls a base station. In this example there may further be more than two network nodes, e.g. four network nodes. The cellular network 100 comprises a plurality of cells whereof four cells, a first cell 115, a second cell 116, a third cell 117 and a fourth cell 118 are depicted in FIG. 1.

The network node 110 serves multiple cells, such as e.g. the first cell 115 and the second cell 116. The second network node 112 serves multiple cells, such as e.g. the third cell 117 and the fourth cell 118 are depicted in FIG. 1.

A number of user equipments are located in the cells 115, 116 served by the network node 110. In the example scenario of FIG. 1, only two user equipments are shown in the cell 115, the user equipments 121, 122.

The user equipments 121, 122 are capable of accessing the cellular network 100 via the network node 110 when they are located in the first cell 115 and/or the second cell 116 and via the second base station 112 when they are located in the third cell 117 and/or the fourth cell 118. The user equipments 121 and 122 may e.g. be mobile terminals or wireless terminals, mobile phones, computers such as e.g. laptops, Personal Digital Assistants (PDAs) or tablet computers, sometimes referred to as surf plates, with wireless capability, Machine-to-Machine (M2M) devices or any other radio network units capable to communicate over a radio link in a cellular communications network.

A number of user equipments are moving as a group with a correlated mobility pattern. The number of user equipments in the group may vary between only two user equipments up to a huge number such as hundreds or even thousands of user equipments. In FIG. 1, two user equipments, the user equipments 121, 122 are moving with a correlated mobility pattern. The user equipment 121 is moving along a path illustrated by an arrow 131 from the first cell 115 towards the third cell 117. The user equipment 122 is moving along a path illustrated by an arrow 132 from the second cell 116 towards the fourth cell 118. The user equipments 121, 122 moving with a correlated mobility pattern mean that the user equipments 121, 122 move together as a group. For example they may move together in a vehicle such as a car, a bus, a train, or a boat. Please note that the velocity and direction has not to exactly the same for the user equipments 121, 122, for example moving with a correlated mobility pattern also comprises the case when the two user equipments 121, 122 are located on a train where one user using one of the user equipments 121 stands at the train, and another user using the other of the user equipments 122 moves within the train. In this case the velocities and directions of the respective user equipments 121, 122 are not exactly the same, but they are quite similar or almost the same, i.e. the user equipments 121, 122 have a correlated mobility pattern.

Handover

The cellular network 100 covers a geographical area which is divided into cell areas, wherein each cell area being served by a base station, such as the network node 110 and the second network node 112. The cells in FIG. 1 are illustrated as circle shaped, but the cells may be shaped in any way, one cell may even comprise two or more geographical areas. The cells in the cellular network 100 overlap each other, such that a user equipment that moves within the cellular network 100 from one cell to another, i.e. from a source cell served by a source network node to a target cell served by a target network node, passes through a geographical region which is covered by both the source cell and the target cell. Please note that the source network node may be the same node as the target network node. This geographical region is referred to as a geographic handover region herein. In the geographic handover regions a moving user equipment may perform handover from a source cell served by a source network node to a target cell served by a target network node. The handover is decided based on measurements by the user equipments 121, 122 of signals sent the network node serving the source cell and from the network node serving the target cell. For example, in FIG. 1, the user equipment 121 moves through a geographic handover region 141, wherein a handover from the first cell 115 to the third cell 117 may be performed. Further, the user equipment 122 moves through a geographic handover region 142 wherein a handover from the second 116 cell to the fourth cell 118 may be performed. To make FIG. 1 more readable, the first cell 115 and the third cell 117 are illustrated with broken lines, while the second cell 116 and the fourth cell 118 are illustrated with unbroken lines. The geographic hand over regions 141 and 142 are illustrated as areas filled with diagonal lines.

Please note that the term handover used herein also means cell selection. For idle user equipments a handover is typically called cell (re-)selection and the term handover is used for connected user equipments, but in this document, the term handover comprises both.

A cell is defined by the carrier that provides the cell specific signalling for the user equipment. Embodiments herein are applicable as long as there is more than one carrier available. Note that there is no need for carrier aggregation, the embodiments herein are applicable with single carrier transmission, just that there has to be at least two carriers available. For example there may be one carrier used for GSM and one for WCDMA and a receiver in the network node 110 which only can handle one of GSM and WCDMA at a time. Nevertheless, embodiments herein are applicable for carrier aggregation. This will be further described below.

To avoid signaling peaks, which may lead to handover failures, embodiments herein use the existing handover mechanisms defined in 3GPP and additionally distribute the handover signaling within a group of user equipments 121, 122 with correlated mobility pattern. Operators of the cellular network 100 have a set of frequency carriers available for communication. According to embodiments herein, the carriers in said set of frequency carriers have different handover regions 141, 142, or may be configured to be different for the different carriers. For example, according to embodiments herein, the cells 115-116 are configured per carrier such that geographic handover region 141 of the carrier of cell 115 differ from the geographic handover region 142 of the carrier of the cell 116.

Further according to embodiments herein, the user equipments 121, 122 that move as a group are identified. Then a set of useable carriers per user equipment is identified, in which the carriers have different geographic handover regions 141, 142. The carriers in the set are allocated to the user equipments 121, 122 so that the group of user equipments 121, 122 is distributed among the carriers.

The high signalling peeks arises when all user equipments are connected to the very same carrier and perform handover at the same time. Therefore, according to embodiments herein, the user equipments are distributed among the available carriers. Likely the number of user equipments will be much larger than the number of available carriers, so there will still be several user equipments per carrier. In the example used herein there is only two user equipments 121, 122 described for simplicity, however, embodiments where the number of user equipments is significantly more than two such as e.g. 200 user equipments in a train doing simultaneous handover may be a typical scenario with a high signalling peek. In this case the signalling peek will be well reduced when the user equipments according to embodiments herein are spread among the two or more carriers to smear out the handover in time.

Figure 2:
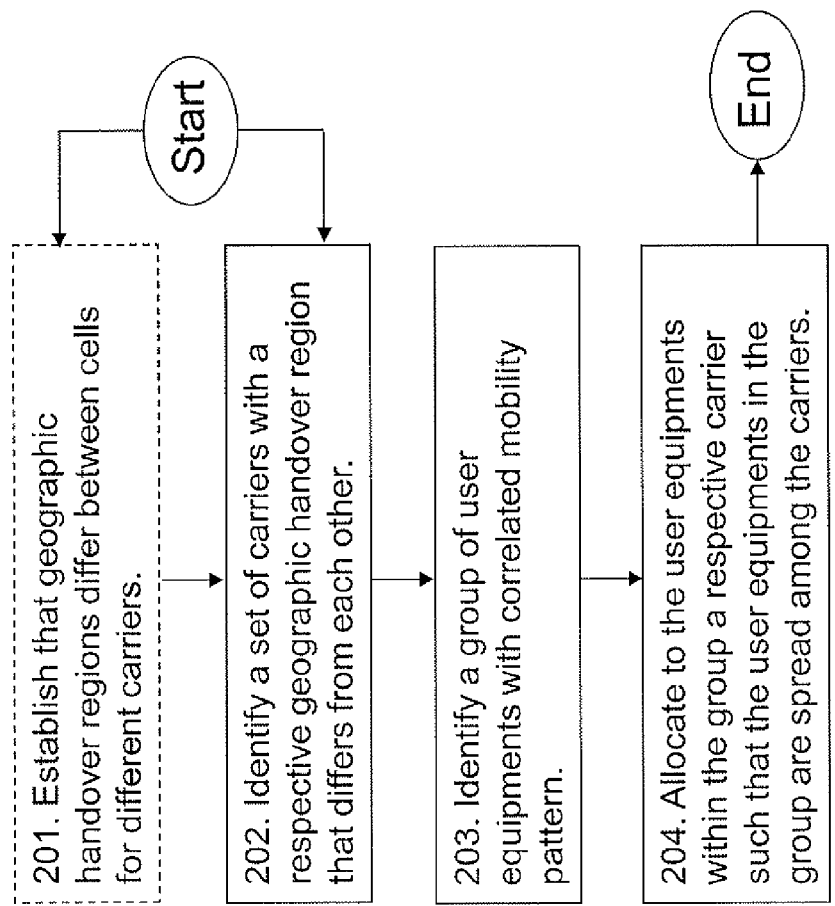
FIG. 2 is a flowchart depicting embodiments of a method in a network node.

Example of embodiments of a method in the network node 110 for allocating to user equipments 121, 122 a respective carrier will now be described with reference to a flowchart depicted in FIG. 2. As mentioned above, the carrier is a frequency carrier for wireless communication. The network node 110 is comprised in the cellular network 100.

The network node 110 serves cells 115, 116 comprising geographic handover regions 141, 142 that differ between the cells for different carriers. E.g. the cellular network 100 may be designed for differing geographic handover regions 141, 142 for different carriers during cellular network planning and/or configuration. This may be achieved in many ways e.g. by shifting the centers of cell sectors among different carriers, antenna beamforming, or antenna tilting. Therefore in some embodiments, the cells in the cellular network 100 are configured per carrier such that geographic handover regions 141, 142 between cells differ among different carriers in the set of carriers. Also without specific cell configurations, there may be different handover regions 141, 142 for different carriers. As an alternative, this may be established by the network node 110, see Action 201 below.

In some embodiments, the method is performed only for non-stationary user equipments, i.e. user equipments that move at least at a certain velocity.

The method comprises the following actions, which actions may be taken in any suitable order. Dashed lines of some boxes in FIG. 2 indicate that this action is optional and not mandatory.

Action 201

The network node 110 may actively learn the differences between the geographic handover regions 141, 142. The network node 110 may establish the geographic handover regions 141, 142 of the cells for the different carriers in the set of carriers, by correlating handover events of user equipments 121, 122 between cells, with respective locations of the user equipments 121, 122 and the respective carriers being used. Another way is by cell measurement reports that are provided by user equipments from different locations of the cells. Thereby the cellular network 100 and the base station 110 may classify and learn where radio cell handover regions 141, 142 for different carriers differ. This may also be used for RAN reconfiguration to maximize the difference, by radio Self-Optimizing Network (SON). The cellular network 100 and/or the base station 110 may also determine to configure the network deployment with displaced handover regions for regions where group mobility is typical, like traffic and/or transport routes such as streets, railway tracks, ship routes, etc.

This action may be a more static action and it is not required to be performed so often. Further it may be performed per site.

Action 202

In this action the network node 110 identifies a set of carriers. The carriers in the set of carriers, each is associated with a respective geographic handover region for handover between cells. The geographic handover regions of the carriers differ from each other more than a threshold. The threshold may be determined in a separate offline analysis, but also be learned by the network node 110 as part of self-configuration, e.g. by using multiple values and determining corresponding signalling peaks. Thresholds may also be determined adaptively, e.g. depending on the velocity of at least one of the devices, e.g. faster user equipments may have larger thresholds. The threshold is typically defined in meters.

As mentioned above, the set of carriers comprises more than one carrier.

Also this action may be a more static action and it is not required to be performed so often. Further it may be performed per site. E.g. the same two carriers may have at some base station different handover regions and at others they have overlapping handover regions.

The following actions 203-204 are more dynamic than the actions 201-202, may be performed per site/cell and are user equipment specific.

Action 203

As mentioned above, a number of user equipments are moving as a group with a correlated mobility pattern. The number of user equipments in the group may vary between only two user equipments up to a huge number such as hundreds of user equipments. As a simple example, two user equipments, the user equipments 121, 122 are moving with a correlated mobility pattern. For example they may move together in a vehicle such as a car, a bus, a train, or a boat.

In this action, the network node 110 identifies the group of user equipments 121, 122 with correlated mobility pattern.

The group mobility of user equipments 121, 122 may be determined in multiple ways. In some embodiments the group of user equipments 121, 122 with correlated mobility pattern are identified by determining user equipment positions and correlation proximity of positions among multiple user equipments over time, and/or by tracking correlation of identical handover events among multiple user equipments. This may be performed during a time period longer than a second threshold or a number of handovers. By ensuring that mobility patterns of multiple user equipments correlate over a certain time span, the certainty may be increased that user equipments determined to move as a group do really do so.

Action 204

According to embodiments herein, the user equipments 121, 122 from the user equipment group with correlated mobility pattern shall be distributed among the set of carriers, e.g. such that they are spread as uniformly as possible among carriers where the radio cell handover regions 141, 142 differ more than a threshold. This is to prevent a signalling peak due to handover of the respective user equipments within the moving group at the same time. The threshold may be location dependent and/or time dependent. In locations with typically higher cell loads, larger thresholds may be useful and vice versa. Also time dependent thresholds may be increased at times of high cell loads and lower at lower loads. Therefore, the network node 110 allocates to at least two of the user equipments 121, 122 within the group of user equipments 121, 122 a respective different carrier in the set of carriers. The carriers may be allocated to at least two of the user equipments 121, 122 or up to the complete group of user equipments, if the group comprises more than two user equipments. As described more in detail below, carrier selection may be based on load in cells of different carriers, service requirements, velocity, and/or handover rate. All those reasons may motivate an allocation which may differ from the best allocation from perspective according to embodiments herein for reducing handover signalling peaks. In this case it may be beneficial to apply the embodiments only on a subset of user equipments to avoid handover signalling exceeding a threshold, but still have many user equipments allocated according to their other objectives. The carriers are allocated to the respective user equipment 121, 122 in the group such that the at least two user equipments 121, 122 in the group are spread among the carriers in the set of carriers. In some embodiments, they may be spread as uniformly as possible. The allocation may be e.g. based on cell capacity, certain carriers may have larger capacity then others, cell load, service requirements, velocity of devices; in this case embodiments herein would only provide an additional objective of deviating from another allocation strategy by having some user equipments allocated according to breaking up correlated mobility groups. The respective allocated carrier may correspond to a primary component carrier for one or more of the user equipments 121, 122 using carrier aggregation. A radio cell is determined by cell-specific signalling. While data transmission may take place on multiple carriers simultaneously, e.g. if carrier aggregation is used, the user equipment 121, 122 is typically connected to only one cell. The term carrier aggregation means that at a transmission might take place on two carriers simultaneously. The carriers might be in the same band or in different bands. This is a means to increase the total supported data rate without the need for contiguous spectrum and which allows for a possible simpler implementation.

In some embodiments, the allocating to the respective user equipments 121, 122 further comprises selecting a respective Radio Access Technology (RAT) to be used. The selecting of the respective RAT to be used may be based on service requirements of the respective user equipment 121, 122. Different services have different requirements and certain RATs have certain characteristics. E.g. LTE achieves significantly lower end-to-end delays or peak rates than HSPA. So services requiring what cannot be achieved with HSPA may be allocated to LTE, and a group mobility based allocation to HSPA should be avoided In addition other parameters may be considered. The allocating to the respective user equipments 121, 122 of the respective carriers may further be based on one or more out of:

Data and/or signalling traffic load in the cells of the different carriers in the set of carriers. Traffic load distribution objectives are matched with group mobility objectives, which objective of the embodiments herein is to mitigate signaling peaks. If there is low network load, signaling peaks may not be problematic. For load distribution there is some flexibility for compensating group-mobility-based-allocations by re-allocating user equipments which are not part of a mobility group. So if for load management purposes some target load levels for cells of different carriers are defined, the group-mobility motivates to separate user equipments within the moving group to different carriers and then use user equipments not subject to group mobility to approach the target load distribution.

User equipment capabilities regarding the carriers in the identified set of carriers and/or a selected RAT, to be used. Different user equipments may have different capabilities, which can enable or limit what carries can be used by a user equipment. The performance provided to a service may be selected depending of service requirements of the user equipments 121, 122 and the service that respective RAT provides.

The cell size of the carriers in the identified set of carriers. Depending on the velocity of the mobility group certain cell sizes may be preferred e.g. large cells for fast moving groups. Cell sizes are typically depending on the frequency band. Higher frequencies lead to smaller cell sizes due to larger propagation loss. Depending on the group mobility certain carriers may be excluded from the set of useable carriers. Carriers with small cells are not recommended for user equipments moving at high velocities.

The velocity of the group of user equipments 121, 122.

Handover frequency. At high handover frequency carriers with small cells should be avoided. Handover frequency is how often a handover is done or expected to be done. A high handover frequency means that a user equipment is making handover relatively often. An example is when moving fast. Since some cells are larger than others, it is preferable to allocate fast moving user equipments to large cells to decrease the number of handovers.

The cell size may depend on output power, but also for the same output power it may depend on the used carrier frequency as the propagation loss increases with higher frequency. Thus, if a user equipment is moving fast so that many handover per time unit is expected, i.e. high handover frequency, it is preferable to allocate that user equipment to large cells, which in turn might mean cells where the carrier frequency is as low as possible.

Service requirements of the respective user equipments.

The embodiments in the text below may be combined with any embodiment above.

In some embodiments of the invention, mainly intended for situations with a huge number of user equipments including user equipments 121, 122, so that distributing the user equipments among two or more carriers is not enough, the handover may be accomplished by going via another RAT. In this case, preferably but not necessarily, a distinction may further be made between those user equipments which are active and those which are not active. As an example, suppose that all user equipments in the group are using LTE, and that the natural handover would be from LTE in one cell to LTE to another cell, possibly spread among carriers as described above. In case there is an application such as e.g. file transfer, financial transactions, etc., which requires seamless handover, this is also what should happen. A seamless handover is handover with low delay and without data loss. However, suppose a user equipment, such as any of the user equipments 121, 122 is idle, and all that is required is to maintain the connection between the idle user equipment and the cellular network 100. In this situation a handover may first be performed to, for example GSM, the idle user equipment is then connected using GSM until all user equipments that are active in the group with more time critical requirements have performed their handover. Then a handover is performed from GSM to LTE in the new cell if needed. As GSM often has better coverage than LTE, this means that the geographical handover region where handover can take place is largely extended. As an example, suppose using different carriers, the geographical handover region is on the order of, for example 50 meters, by going via another RAT with better coverage, the region might be, say, 200 meters. Similarly, the number of user equipments put on different technologies may be impacted by the handover capabilities, the amount of resources needed to perform a handover related to the total amount of available resources, of the technologies.

Therefore, in some first embodiments a handover of any one of the user equipments 121, 122 within the group of user equipments 121, 122 to one of the cells being associated with a first RAT, may be arranged to be performed via a cell associated with a second RAT.

Figure 4:
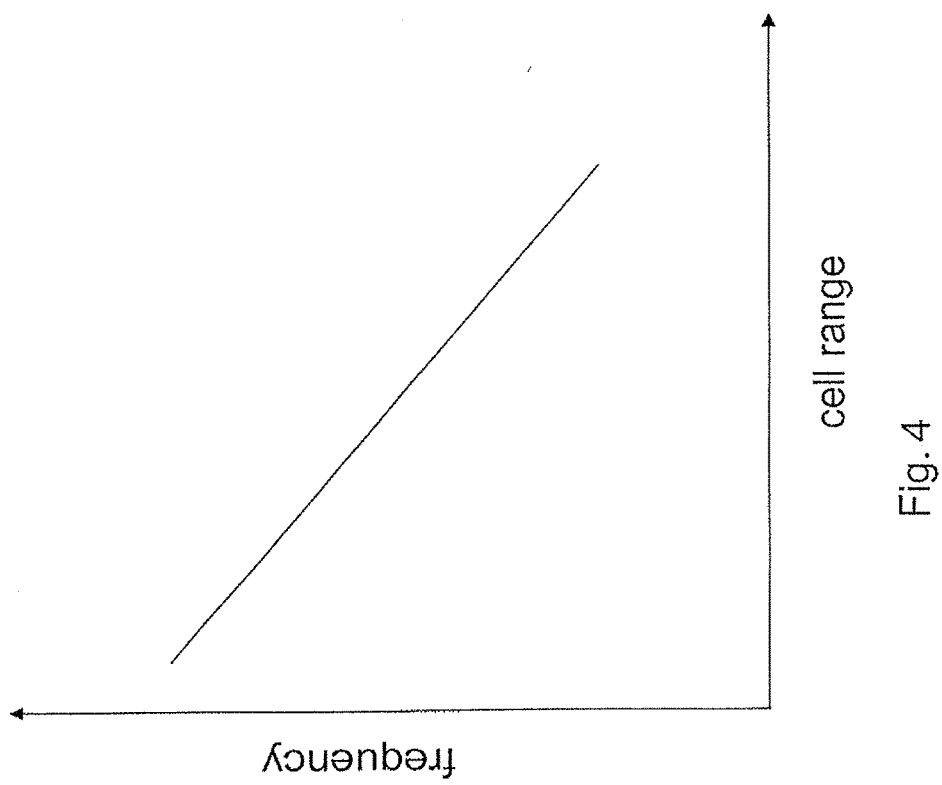
FIG. 4 is a schematic diagram illustrating a graph demonstrating frequency versus cell size while in handover.

In some second embodiments, a handover of any one of the user equipments 121, 122 within the group of user equipments 121, 122 to one of the cells being associated with a first carrier comprising a first frequency, is arranged to be performed via a cell associated with second carrier comprising a second frequency. The frequency of the first RAT or the first carrier may be higher than the frequency of the second RAT or the second carrier. This is an advantage since lower frequency tends to have a longer range, less handover regions and larger handover regions. These second embodiments may be combined with the first embodiments above. This is indicated in the schematic diagram of FIG. 4 wherein the frequency is shown on the y-axis, and size of cell is shown on the x-axis.

Whether or not arrange to perform the handover via the cell associated with the second RAT and/or via the cell associated with the second carrier, may depend on whether said any one of the user equipments 121, 122 within the group of user equipments 121, 122 being in active mode or not.

According to a specific embodiment the user equipments 121, 122 within the group of user equipments 121, 122 uses LTE. Further, the handover of the user equipments 121, 122 within the group of user equipments 121, 122 to arrange for, is from one cell associated with LTE to another cell associated with LTE and one or more specific user equipments within the group of user equipments 121, 122 are in idle mode. In this specific embodiment the handover of the one or more specific user equipment is arranged to be performed via a cell associated with GSM or WCDM. Please note that the term handover used herein also means cell selection. For idle user equipments a handover is typically called cell (re-)selection and the term handover is used for connected user equipments, but in this document, the term handover comprises both.

Note, that with the diversity of carriers in many different bands, it is expected that even with restriction to e.g. low-frequency bands a sufficient number of carriers exist to execute embodiments herein.

Figure 3:
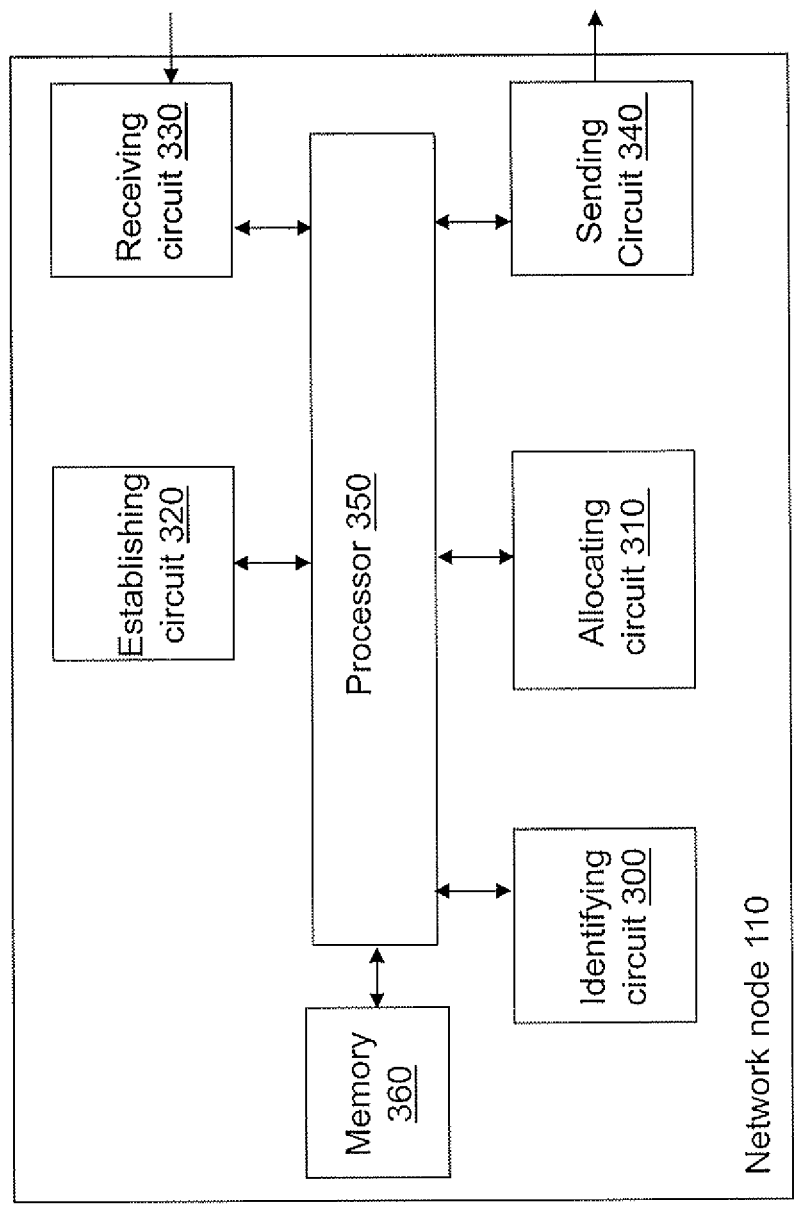
FIG. 3 is a schematic block diagram illustrating embodiments of a network node.

To perform the method actions for allocating to the user equipments 121, 122 a respective carrier, the network node 110 comprises the following arrangement depicted in FIG. 3. As mentioned above the carrier is a frequency carrier for wireless communication. The network node 110 is arranged to be comprised in the cellular network 100. In some embodiments, the cells in the cellular network 100 are configured per carrier such that geographic handover regions 141, 142 between cells differ among different carriers in the set of carriers.

The network node 110 comprises an identifying circuit 300 configured to identify a set of carriers. The carriers in the set of carriers each are associated with a respective geographic handover region for handover between cells. The geographic handover regions of the carriers differ from each other more than a threshold.

The identifying circuit 300 is further configured to identify a group of user equipments 121, 122 with correlated mobility pattern.

The identifying circuit 300 may further be configured to identify the group of user equipments 121, 122 with correlated mobility pattern by determining user equipment positions and correlation proximity of positions among multiple user equipments over time, and/or by tracking correlation of identical handover events among multiple user equipments.

The network node 110 further comprises an allocating circuit 310 configured to allocate to at least two of the user equipments 121, 122 within the group of user equipments 121, 122 respective different carrier in the set of carriers, such that the at least two user equipments in the group are spread among the carriers in the set of carriers.

In some embodiments, the allocating circuit 310 is further configured to select a respective RAT to be used. The selection of the respective RAT to be used may be based on service requirements of the respective user equipment 121, 122.

In some embodiments, the respective allocated carrier corresponds to a primary component carrier for one or more of the user equipments using carrier aggregation.

The allocating circuit 310 may further be configured to allocate to the respective user equipments 121, 122 of the respective carriers, further based on one or more out of:

Data and/or signalling traffic load in the cells of the different carriers in the set of carriers.

User equipment capabilities regarding the carriers in the identified set of carriers and/or a selected RAT, to be used.

The cell size of the carriers in the identified set of carriers.

The velocity of the group of user equipments 121, 122, and

Handover frequency.

Service requirements of the respective user equipments.

The network node 110 may further comprise an establishing circuit 320 configured to establish the geographic handover regions 141, 142 of the cells for the different carriers in the set of carriers, by correlating handover events of user equipments 121, 122 between cells, with respective locations of the user equipments 121, 122 and the respective carriers being used, or by cell measurement reports that are provided by user equipments from different locations of the cells.

In some first embodiments, a handover of any one of the user equipments 121, 122 within the group of user equipments 121, 122 to one of the cells being associated with a first RAT, may be arranged by the network node 110 to be performed via a cell associated with a second RAT.

In some second embodiments, a handover of any one of the user equipments 121, 122 within the group of user equipments 121, 122 to one of the cells being associated with a first carrier comprising a first frequency, may be arranged to be performed via a cell associated with second carrier comprising a second frequency. These second embodiments may be combined with the first embodiments above.

In some embodiments, the frequency of the first RAT or the first carrier is higher than the frequency of the second RAT or the second carrier.

Whether or not arrange by the network node 110 to perform the handover via the cell associated with the second RAT and/or via the cell associated with the second carrier, may depend on whether said any one of the user equipments 121, 122 within the group of user equipments 121, 122 being in active mode or not.

According to a specific embodiment the user equipments 121, 122 within the group of user equipments 121, 122 uses LTE. Further, the handover of the user equipments 121, 122 within the group of user equipments 121, 122 to arrange for, is from one cell associated with LTE to another cell associated with LTE and one or more specific user equipments 121, 122 within the group of user equipments 121, 122 are in idle mode. In these embodiments the handover of the one or more specific user equipment is arranged to be performed via a cell associated with GSM or WCDM.

The network node 110 may further comprise a receiving circuit 330 configured to receive signals and/or data from user equipments or from the cellular network 100. The network node 110 may further comprise a sending circuit 340 configured to send signals and/or data from user equipments or from the cellular network 100.

The embodiments herein for allocating to the user equipments 121, 122 a respective carrier may be implemented through one or more processors, such as a processor 350 in the network node 110 depicted in FIG. 3, together with computer program code for performing the functions and actions of the embodiments herein. The program code mentioned above may also be provided as a computer program product, for instance in the form of a data carrier carrying computer program code for performing the embodiments herein when being loaded into the in the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 360 comprising one or more memory units. The memory 360 is arranged to be used to store requests, and information mentioned above. Further to store data, configurations, schedulings, and applications to perform the methods herein when being executed in the network node 110.

Those skilled in the art will also appreciate that the identifying circuit 300, the allocating circuit 310, the establishing circuit 320, the receiving circuit 340, and the sending circuit 350, described above may refer to a combination of analog and digital circuits, and/or one or more processors configured with software and/or firmware, e.g. stored in a memory such as the memory 360, that when executed by the one or more processors such as the processor 350 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a network node for allocating to user equipments a respective carrier, which carrier is a frequency carrier for wireless communication, and which network node is comprised in a cellular network, the method comprising:

establishing geographic handover regions of cells for different carriers in the set of carriers, by correlating handover events of user equipments between cells, with respective locations of the user equipments and respective carriers being used, or by cell measurement reports that are provided by user equipments from different locations of the cells;

identifying a set of carriers, which carriers in the set of carriers each is associated with a respective geographic handover region for handover between the cells,
which the geographic handover regions of the carriers differ from each other more than a threshold,
identifying a group of user equipments with correlated mobility pattern, and
allocating to at least two of the user equipments within the group of user equipments respective different carrier in the set of carriers, such that the at least two user equipments in the group are spread among the carriers in the set of carriers.

2. The method according to claim 1, wherein cells in the cellular network are configured per carrier such that geographic handover regions between cells differ among different carriers in the set of carriers.

3. The method according to claim 1, wherein the allocating to the respective user equipments further comprises selecting a respective Radio Access Technology, RAT, to be used.

4. The method according to claim 3, wherein the selecting of the respective RAT to be used is based on service requirements of the respective user equipment.

5. The method according to claim 1, wherein identifying the group of user equipments with correlated mobility pattern is performed by determining user equipment positions and proximity of positions among multiple user equipments over time.

6. The method according to claim 1, wherein the respective allocated carrier corresponds to a primary component carrier for one or more of the user equipments using carrier aggregation.

7. The method according to claim 1, wherein the allocating to the respective user equipments of the respective carriers further is based on one or more out of:
data and/or signalling traffic load in the cells of the different carriers in the set of carriers,
user equipment capabilities regarding the carriers in the identified set of carriers and/or a selected RAT, to be used,
the cell size of the carriers in the identified set of carriers
the velocity of the group of user equipments,
handover frequency, and
service requirements of the respective user equipments.

8. The method according to claim 1, wherein a handover of any one of the user equipments within the group of user equipments to one of the cells being associated with a first RAT, is arranged to be performed via a cell associated with a second RAT.

9. The method according to claim 1, wherein a handover of any one of the user equipments within the group of user equipments to one of the cells being associated with a first carrier comprising a first frequency, is arranged to be performed via a cell associated with second carrier comprising a second frequency.

10. The method according to claim 8, wherein the frequency of the first RAT or the first carrier is higher than the frequency of the second RAT or the second carrier.

11. The method according to claim 8, wherein whether or not arrange to perform the handover via the cell associated with the second RAT and/or via the cell associated with the second carrier, depends on whether said any one of the user equipments within the group of user equipments being in active mode or not.

12. The method according to claim 8,
wherein the user equipments within the group of user equipments uses Long Term Evolution, LTE,
wherein the handover of the user equipments within the group of user equipments to arrange for, is from one cell associated with LTE to another cell associated with LTE,
wherein one or more specific user equipments within the group of user equipments are in idle mode,
and wherein the handover of the one or more specific user equipment is arranged to be performed via a cell associated with GSM or WCDMA.

13. A network node for allocating to user equipments a respective carrier, which carrier is a frequency carrier for wireless communication, and which network node is arranged to be comprised in a cellular network, the network node comprising:
an establishing circuit configured to establish geographic handover regions of cells for different carriers in the set of carriers, by correlating handover events of user equipments between cells, with respective locations of the user equipments and respective carriers being used or by cell measurement reports that are provided by user equipments from different locations of the cells; and
an identifying circuit configured to identify a set of carriers, which carriers in the set of carriers each is associated with a respective geographic handover region for handover between the cells,
which the geographic handover regions of the carriers differ from each other more than a threshold,
wherein the identifying circuit further is configured to identify a group of user equipments with correlated mobility pattern, and
the network node further comprising an allocating circuit configured to allocate to at least two of the user equipments within the group of user equipments respective different carrier in the set of carriers, such that the at least two user equipments in the group are spread among the carriers in the set of carriers.

14. The network node according to claim 13, wherein cells in the cellular network are configured per carrier such that geographic handover regions between cells differ among different carriers in the set of carriers.

15. The network node according to claim 13, wherein the allocating circuit further is configured to select a respective Radio Access Technology, RAT, to be used.

16. The network node according to claim 15, wherein the selection of the respective RAT to be used is based on service requirements of the respective user equipment.

17. The network node according to claim 13, wherein the identifying circuit further is configured to identify the group of user equipments with correlated mobility pattern by determining user equipment positions and proximity of positions among multiple user equipments over time.

18. The network node according to claim 13, wherein the respective allocated carrier corresponds to a primary component carrier for one or more of the user equipments using carrier aggregation.

19. The network node according to claim 13, wherein the allocating circuit further is configured to allocate to the respective user equipments of the respective carriers, further based on one or more out of:
data and/or signalling traffic load in the cells of the different carriers in the set of carriers,
user equipment capabilities regarding the carriers in the identified set of carriers and/or a selected RAT, to be used,
the cell size of the carriers in the identified set of carriers,
the velocity of the group of user equipments, handover frequency, and service requirements of the respective user equipments.

20. The network node according to claim 13, wherein a handover of any one of the user equipments within the group of user equipments to one of the cells being associated with a first RAT, is arranged to be performed via a cell associated with a second RAT.

21. The network node according to claim 13, wherein a handover of any one of the user equipments within the group of user equipments to one of the cells being associated with a first carrier comprising a first frequency, is arranged to be performed via a cell associated with second carrier comprising a second frequency.

22. The network node according to claim 20, wherein the frequency of the first RAT or the first carrier is higher than the frequency of the second RAT or the second carrier.

23. The network node according to claim 20, wherein whether or not arrange to perform the handover via the cell associated with the second RAT and/or via the cell associated with the second carrier, depends on whether said any one of the user equipments within the group of user equipments being in active mode or not.

24. The network node according to claim 20, wherein the user equipments within the group of user equipments uses Long Term Evolution, LTE, wherein the handover of the user equipments within the group of user equipments to arrange for, is from one cell associated with LTE to another cell associated with LTE, wherein one or more specific user equipments within the group of user equipments are in idle mode, and wherein the handover of the one or more specific user equipment is arranged to be performed via a cell associated with GSM or WCDMA.

* * * * *